Sept. 23, 1941. E. V. RIPPINGILLE 2,256,726
CRANKSHAFT CONSTRUCTION
Filed Aug. 24, 1939
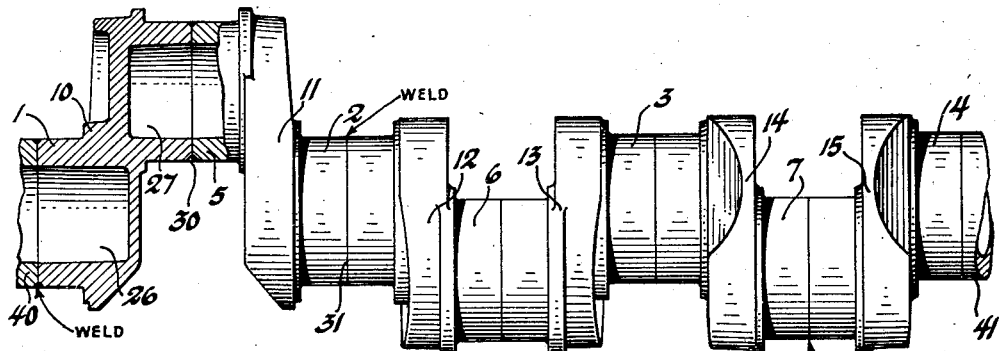
Fig. 1
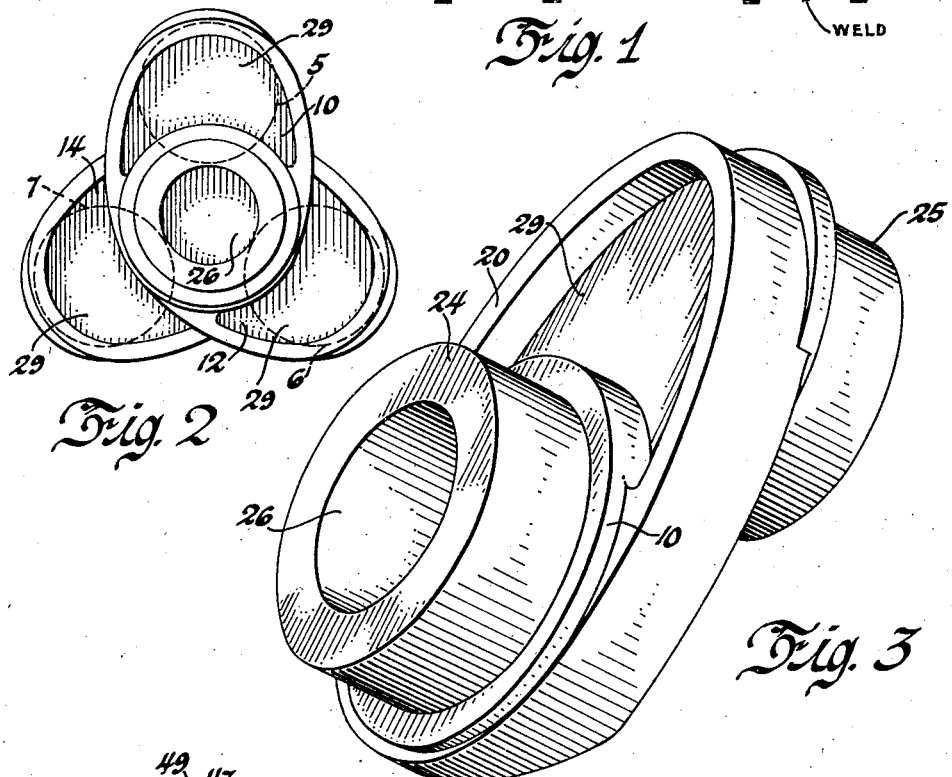
Fig. 2
Fig. 3
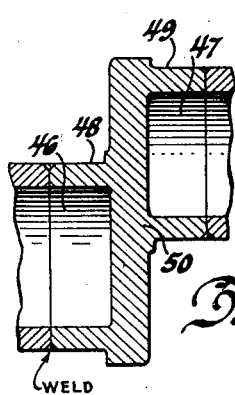
Fig. 4
Inventor
Edward V. Rippingille
By Blackmore, Sweeney & Flint
Attorneys Patented Sept. 23, 1941

2,256,726

UNITED STATES PATENT OFFICE 2,256,726

CRANKSHAFT CONSTRUCTION

Edward V. Rippingille, Detroit, Mich., assignor to General Motors Corporation, Detroit, Mich., a corporation of Delaware Application August 24, 1939, Serial No. 291,723

3 Claims. (Cl. 74—597)

This invention relates to crankshafts built up of a number of separate parts.

The object of the invention is a crankshaft with hollow crankpins and main journals, built up of similar separate parts which are relatively simple and cheap to make.

A further object of the invention is a built up crankshaft with hollow main journal and crankpin portions, and crank cheeks of ideal shape, contour and section, for maximum strength with minimum weight.

The above and other objects of the invention will be apparent as the description proceeds.

According to the invention, the separate parts each comprise half a crank throw, including a single crank cheek having cupped bosses on opposite sides thereof constituting approximately half a main journal and half a crankpin portion respectively.

The separate parts may be cast or formed in any suitable way, but are preferably forgings. They can be forged in a simple, small and inexpensive die, in a plane at right angles to the crankshaft axis, with the crank cheek, main journal and crankpin portions cupped or hollowed out to any desired extent, in a direction parallel to the crankshaft axis.

Two such separate parts comprising half a crank throw may have their crankpin portions joined together to form a single throw crankshaft.

A crankshaft with any desired number of throws can be constructed from single throws having adjacent journal portions joined together with the crankpins at the requisite angle to each other.

The drawing shows two examples of a construction according to the invention.

In the drawing:

Fig. 1 is a view in elevation and partly in section of a three throw crankshaft.

Fig. 2 is an end view of Fig. 1.

Fig. 3 is an enlarged perspective view of one of the six separate parts comprising half a crank throw, of which the crankshaft of Fig. 1 is constructed.

Fig. 4 is a sectional view of a part of a crankshaft having a shorter throw than that of Figs. 1, 2 and 3.

The crankshaft of Figs. 1 and 2 has four main bearings 1, 2, 3 and 4, and three crankpins 5, 6 and 7, at 120° to each other. It is built up of six identical forgings 10, 11, 12, 13, 14 and 15 respectively, each comprising half a crank throw.

As shown most clearly in Fig. 3, each half crank throw such as 10 includes a single crank cheek 20, with bosses 24 and 25 on opposite sides thereof. The bosses 14 and 15 have cupped depressions 26 and 27 and constitute half of a hollowed out main journal, and half of a hollowed out crankpin respectively. The crank cheek 20 is forged with a rimmed crescent shaped depression 29 on the side opposite to the crankpin portion 25, for maximum strength with lightness.

The half crank throws such as 10 are welded together, crankpin portion to crankpin portion, as shown for example at 30 in Fig. 1, to form a complete throw; if as in Figs. 1 and 2, there is more than one throw, successive throws are welded together, main journal portion to main journal portion, as shown for example at 31 in Fig. 1, with the crankpins at the requisite angle to each other.

The main journals 1 and 4, at each end of the crankshaft, are completed, and any desired extension of the ends of the crankshaft is provided, by welding pieces such as 40 and 41 respectively thereto.

The construction in Fig. 4 is essentially similar to that of Figs. 1, 2 and 3, but whereas the cupped out depressions 26 and 27 in the main journal and crankpin portions of each half crank throw such as 10 do not overlap in Figs. 1, 2 and 3, the throw is shorter in Fig. 4 and the cupped out depressions 46 and 47 in the main journal and crankpin portions 48 and 49 of the half crank throw 50 do overlap.

It will be appreciated that a built up crankshaft of the kind illustrated makes it possible to obtain hollow pins and journals to an extent otherwise impossible, and actually to improve the shape, contour and section of the crank cheeks, instead of weakening them as would be the case in boring a shaft forged in the conventional manner, for the reason that the crankpins and main journals cannot be bored except with a bore extending through the crank cheeks, and it would be impossible to do this in a solid forged crankshaft having the external proportions of Fig. 4 for instance.

I claim:

1. A crankshaft built up of similar separate integral parts, each comprising half a crank throw including a single imperforated crank cheek having cupped bosses on opposite sides thereof, constituting halves of hollowed out main journal and crankpin portions respectively.

2. A crankshaft according to claim 1, in which the cupped bosses overlap and have overlapping depressions therein.

3. A crankshaft according to claim 1, in which each of the crank cheeks has a rimmed, crescent shaped depression, on the side opposite to the crankpin portion.

EDWARD V. RIPPINGILLE.